Jan. 19, 1932.   R. M. ANDERSON   1,841,695
VALVE ASSEMBLY
Filed May 26, 1930
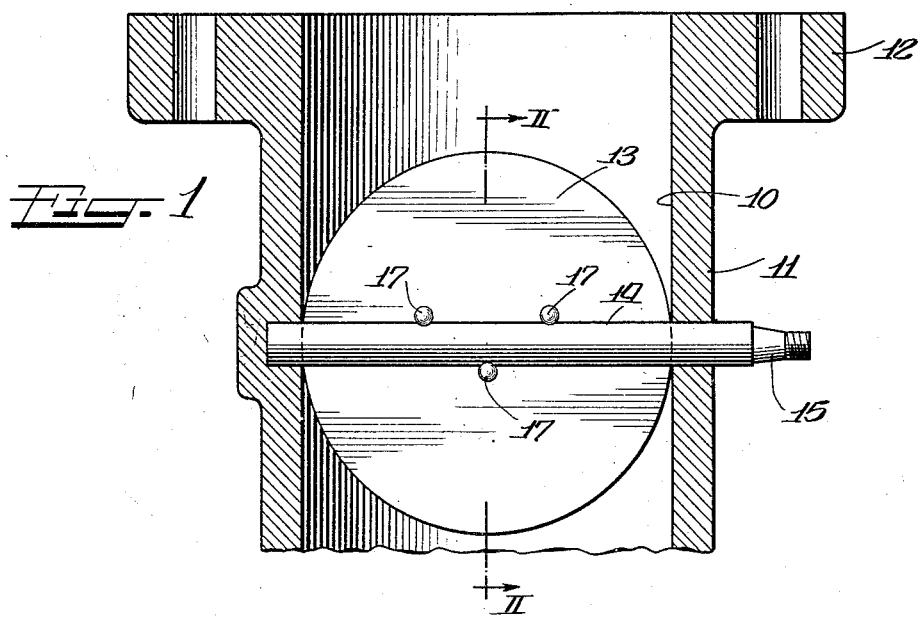
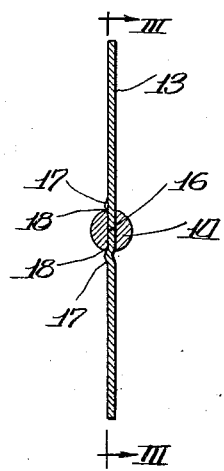
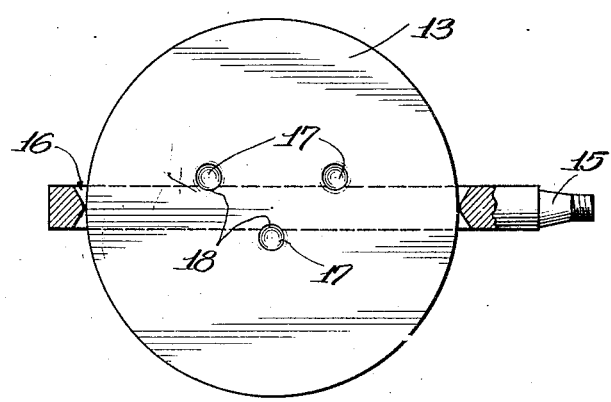
Inventor:
Raymond M. Anderson.
by: Charles Hill

UNITED STATES PATENT OFFICE

RAYMOND M. ANDERSON, OF INDIANAPOLIS, INDIANA, ASSIGNOR TO WHEELER-SCHEBLER CARBURETOR CO., OF INDIANAPOLIS, INDIANA, A CORPORATION OF INDIANA

VALVE ASSEMBLY

Application filed May 26, 1930. Serial No. 455,586.

This invention relates to valve assemblies wherein flat or disc valves are utilized to control mixture or air passages and the like such for example as the throttle and choke valves of carbureters.

It is an object of this invention to provide a simple, inexpensive and readily assembled valve and shaft combination wherein both the shaft and valve can be so preformed as to require no other fastening after assembly together. It has heretofore been necessary to make provisions for one or more small clamp screws when a disc valve is to be assembled to its shaft, the tapping of small holes in the shaft for such screws, and the assembly of the screws therein in a restricted passage have been a relatively expensive part of the final cost of the valve.

It is another object of this invention to provide cooperating valves and shafts which when assembled together are positioned accurately relative to each other by interengaging portions preformed in the valve and shaft and assuring the maintenance of alignment and accurate centering of the valve.

It is another object of this invention to provide a disc or plate valve having indentations struck therein which are so positioned as to engage the edges of a suitable slot cut in the valve shaft, the valve disc being placed in the slot in the shaft and one or more of the humps formed by the indentations driven through the slot to engage the other side thereof.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary section of a carbureter outlet passage showing a throttle valve therein embodying the features of this invention.

Figure 2 is a cross section of the valve and shaft on the line II—II of Figure 1.

Figure 3 is a section on the line III—III of Figure 2 showing the valve in elevation.

As shown on the drawings:

A throttle valve for carbureters has been chosen to illustrate a specific embodiment of this invention, the outlet passage 10 of a carbureter 11 being shown, this passage terminating in a mounting flange 12.

A throttle disc 13 is carried by a cross shaft 14 suitably journalled in the side walls of the outlet passage, one end 15 of the shaft being formed for attachment of the usual operating control, not shown. The shaft is slotted at 16 to receive the disc 13, the particular slot shown being formed with a saw, resulting in the beveled ends shown in Figure 3.

The disc 13 is formed with three or more projections 17 which may conveniently be formed as prick punches. These projections are staggered and so spaced as to engage opposite sides of the shaft to center and retain the disc in position.

It is also an advantage to provide notches 18 in the shaft to cooperate with the projections formed on the valve as by so doing relative longitudinal movement is prevented and an increased bearing surface provided between the projections and the shaft.

In assembling the valve and shaft, the shaft is first positioned in its bearings in the carbureter walls and the edge of the disc started in the slot. Thereupon a tap with a hammer on the upper edge of the valve will drive the lowermost valve projection through the shaft slot, due to the elasticity of the shaft, and the valve will then be permanently assembled in proper position relative to the shaft.

It will thus be seen that I have invented an improved and simplified valve assembly that is economical to manufacture and assemble and that is accurately centered and permanently mounted.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. As an article of manufacture, a valve structure comprising a shaft having a slot, and a disc having offset and spaced projections for aligning said disc in said shaft slot and for preventing movement of the disc relative to the shaft.

2. As an article of manufacture, a valve structure comprising a shaft and a disc having offset and spaced projections for aligning said disc with said shaft and for preventing movement of the disc relative to the shaft, said shaft being slotted and notched to receive the disc and a portion of said projections.

3. As an article of manufacture, a valve structure comprising a slotted shaft and a plate valve having a median portion engageable in the slot in said shaft and projections struck in said plate valve defining the boundary of said median portion for engaging the shaft to prevent movement of the plate valve out of said slot.

4. As an article of manufacture, a valve structure comprising a slotted shaft and a plate valve having a median portion engageable in the slot in said shaft and projections struck in said plate valve defining the boundary of said median portion for engaging the shaft to prevent movement of the plate valve out of said slot, said shaft having notches therein engageable by the projections struck in said plate valve to prevent longitudinal movement therebetween.

5. In combination, a slotted shaft and a valve assembled in the slot in said shaft, said valve having projections formed thereon and so spaced as to engage opposite sides of the shaft to retain said valve in position.

6. In combination, a slotted shaft and a valve assembled in the slot in said shaft, said valve having projections formed thereon and so spaced as to engage opposite sides of the shaft to retain said valve in position, and notches in said shaft at the edges of the slot therein, said notches being adapted to cooperate with the projections formed on said valve whereby to assure alignment thereof.

In testimony whereof I have hereunto subscribed my name at Indianapolis, Marion County, Indiana.

RAYMOND M. ANDERSON.